US006983607B2

(12) United States Patent
Grove et al.

(10) Patent No.: US 6,983,607 B2
(45) Date of Patent: Jan. 10, 2006

(54) TURBINE COMPARTMENT VENTILATION CONTROL SYSTEM AND METHOD USING VARIABLE SPEED FAN

(75) Inventors: Gerald Wilson Grove, Simpsonville, SC (US); Mark David D'Ambruoso, Clifton Park, NY (US); Michael John Barno, Ballston Spa, NY (US); William Andrew Parker, Greenville, SC (US); David Martin Johnson, Simpsonville, SC (US); Gregory Allan Crum, Mauldin, SC (US); Stephen Chiaco, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 10/689,663

(22) Filed: Oct. 22, 2003

(65) Prior Publication Data

US 2005/0086943 A1 Apr. 28, 2005

(51) Int. Cl.
*F02C 7/12* (2006.01)
*F02C 7/20* (2006.01)
(52) U.S. Cl. .......................... 60/797; 60/39.83; 60/803
(58) Field of Classification Search .............. 60/39.83, 60/791, 803, 797; 123/41.12, 41.65, 41.66; 236/49.3, DIG. 9; 417/32; 454/186, 239
See application file for complete search history.

(56) References Cited

U.S. PATENT DOCUMENTS

| 4,977,862 | A | * | 12/1990 | Aihara et al. ............ 123/41.12 |
| 5,406,602 | A | | 4/1995 | Hunsbedt et al. |
| 5,449,961 | A | | 9/1995 | Ludwig et al. |
| 6,339,268 | B1 | | 1/2002 | Kaminski et al. |
| 6,357,221 | B1 | | 3/2002 | Schroeder et al. |
| 6,392,320 | B1 | | 5/2002 | Glahn et al. |
| 6,435,144 | B1 | * | 8/2002 | Dicke et al. ............ 123/41.12 |

OTHER PUBLICATIONS

Declaration of Gerald Grove with two confidential attachments.

* cited by examiner

Primary Examiner—Louis J. Casaregola
(74) Attorney, Agent, or Firm—Nixon & Vanderhye, P.P.C.

(57) ABSTRACT

A method to ventilate a rotary machine housed in a compartment having a ventilation air inlet and air exhaust, a variable speed ventilation fan and a temperature sensor, wherein the method includes: sensing a temperature level of the rotary machine; applying the sensed machine temperature level to a controller for the fan; drawing ventilation flow through the compartment and over the machine; determining whether the sensed machine temperature level is above a desired temperature level of the rotary machine, wherein the desired temperature level is determined by the controller, and the controller setting an operational condition of the fan to increase the ventilation flow through the compartment if the sensed machine temperature level is above the desired temperature level.

19 Claims, 3 Drawing Sheets

TURBINE COMPARTMENT VENTILATION CONTROL SYSTEM AND METHOD USING VARIABLE SPEED FAN

BACKGROUND OF THE INVENTION

This invention relates to power plant ventilation and, specifically, to a ventilation scheme for a gas turbine compartment.

A significant contributor to the increase of net simple and combined cycle efficiencies for large industrial gas turbines is the ability to achieve tighter clearances between the tips of the rotating rotor and a surrounding stator. These tip clearances are influenced by deformations of the shape of the turbine casing that supports the stator around the rotor. Circumferential thermal variations in the casing temperature can lead to shape distortions and negatively impact the efficiency of the gas turbine. Accordingly, there is a long felt need for techniques to reduce the temperature variations applied to a casing so as to reduce thermal induced casing deformation.

Large industrial gas turbines using advanced technologies to achieve higher simple cycle and combined cycle efficiencies are sensitive to local environment conditions, such as the temperature surrounding the gas turbine. Industrial gas turbines are typically housed in an enclosure or compartment (collectively referred to as an compartment). The compartment contains, in addition to the gas turbine, a substantial volume of air surrounding the gas turbine. This air is in direct contact with the casing shell of the gas turbine. If the surrounding air becomes excessively hot, the turbine casing may become excessively hot and deform beyond its tolerances.

Ventilation of a gas turbine compartment removes excess heat from the enclosed air and dilutes hazardous gases that would otherwise buildup in the compartment. Compartments for large industrial gas turbines present ventilation hurdles including: the amount of heat to be removed from the air in the compartment may be large; the compartment may be a complex shape with ventilation flow stagnate zones; the turbine hardware in the compartment blocks ventilation flow, and the buoyancy dominated natural convection of air in an compartment may result in thermal gradients applied to the turbine casing. If the compartment is poorly ventilated, the enclosed air surrounding the gas turbine may apply uneven thermal gradients to the casing that deform the casing. The casing deformations may cause excessive clearances or rubs between the rotor tips and stator within the casing.

Modern industrial gas turbines generally require precise rotor-stator clearance control during transient and steady state operation. To achieve this control the turbine shell casing temperature distribution should be maintained within acceptable limits to minimize casing distortion. These clearance limits may vary during different operating modes of the gas turbine. For example, the turbine clearance limits may be increased during cool down transients to improve the hot restart capability of the turbine.

Constant speed fans are conventionally used for compartment ventilation systems. See e.g., U.S. Pat. No. 6,357,221. Temperature triggered switches in the compartment turn the ventilation fan on and off, and provide an alarm when the air temperature in the compartment exceeds the maximum limit. A disadvantage with an air temperature switch is that the actual operating temperature of the casing is not monitored.

BRIEF DESCRIPTION OF THE INVENTION

In a first embodiment, the invention is a method to ventilate a rotary machine housed in a compartment having a ventilation air inlet and air exhaust, a variable speed ventilation fan and a temperature sensor, wherein the method includes: sensing a temperature level of the rotary machine; applying the sensed machine temperature level to a controller for the fan; drawing ventilation flow through the compartment and over the machine; determining whether the sensed machine temperature level is above or below a desired temperature level of the rotary machine, wherein the desired temperature level is determined by the controller, and the controller setting an operational condition of the fan to increase or decrease the ventilation flow through the compartment if the sensed machine temperature level differs from the desired temperature level.

In a second embodiment, the invention is a method to ventilate an compartment housing a gas turbine, wherein the compartment includes an end wall having an inlet air opening, a roof with an outlet air opening and a fan with a variable speed drive coupled to the outlet air opening, wherein said method comprises: drawing ventilation air flow into the inlet air opening, over the machine and exhausting the air flow through the outlet, wherein a flow rate of the ventilation air is dependent on a speed of the fan; sensing a temperature level of the rotary machine based on signals from a plurality of temperature sensors mounted on a casing of the gas turbine; determining whether the sensed casing temperature is above or below a desired temperature level of the rotary machine, wherein the desired temperature level is determined by the controller, and the controller changes the speed of the fan to increase or decrease the flow rate through the compartment if the sensed casing temperature differs from the desired temperature level.

In a further embodiment, the invention is a ventilated compartment for a rotary machine comprising: said compartment having a roof, end walls and side walls with the machine arranged parallel to the side walls and below the roof; at least one ventilation air inlet located in to a first end wall of said end walls; at least one ventilation air outlet on said roof and proximate to a second end wall opposite to said first end wall; one or more fans for pulling ventilating air into said ventilation air inlets; a variable speed drive coupled to said one or more fans; at least one temperature sensor mounted on said machine and having an temperature sensor output; a fan controller receiving as an input the temperature sensor measurement, including a comparator for determining whether a temperature corresponding to the sensor output is above or below a reference temperature level determined by the controller, and generating an output control signal to the variable speed drive to adjust the speed of the fan.

DETAILED DESCRIPTION OF THE INVENTION

Figure 1:
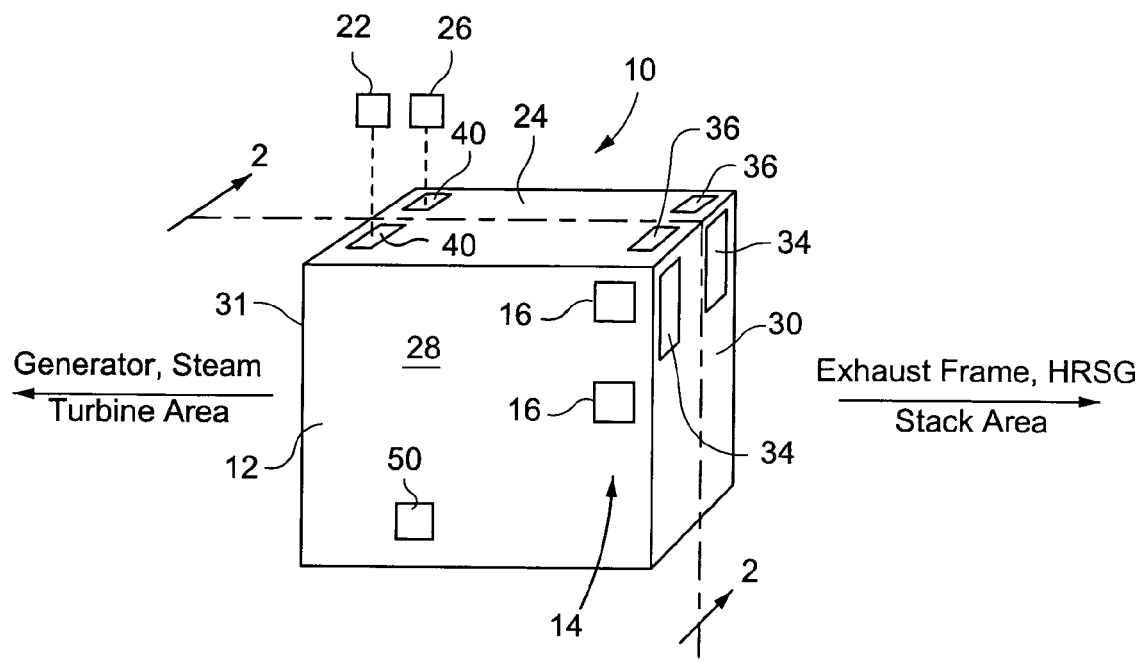
FIG. 1 is a schematic perspective view of a turbine compartment.

A ventilation control method has been developed that operates a variable speed fan with closed loop control so that ventilation air flow through the turbine compartment can be accurately modulated across a wide operating range of the gas turbine. Coupling this control method with an axial flow ventilation system for a turbine housing improves turbine tip clearance control for both steady state and transient gas turbine modes of operation. Gas turbine casing and exhaust duct air thermocouples provide control feedback data for the variable speed fan that ventilates the turbine compartment.

For turbine compartment ventilation, a variable speed fan with feedback control will assist in providing precise clearance control between the shell casings of the gas turbine for both transient and steady state operation. The variable speed fan with feedback control also assists in heat removal and in gas fuel leak dilution to prevent the formation of an explosive mixture in the compartment.

The variable speed fan with feedback compensates for changes in air leakage and flow system pressure drop in the turbine compartment. Air leakage and pressure drops (if not compensated for by the variable speed fan) may lead to flow variations and hence excessive temperatures on the turbine casing or in the ventilation flow exhaust from the compartment. For example, air leakage around compartment door seals and pipe penetrations through compartment walls can result in less than desirable ventilation flow through the turbine shell annulus.

With a variable speed fan, the fan speed can increase to compensate for air leakage or ventilation flow pressure drops in the compartment. If the ventilation pressure drop increases, the casing temperature and the ventilation exhaust temperatures may increase and exceed predetermined maximum temperature limits. A fan controller sensing that the maximum temperature limit(s) have been exceeded adjusts the variable fan speed to increase the ventilation flow ventilation until the correct turbine shell temperature and/or exhaust temperature is reached. Similarly, the fan speed can be decreased if the ventilation pressure drop decreases.

A variable speed fan also provides operating flexibility for start and cool down transients. To avoid rubs between rotor tips and the stator during hot restarts, the casing temperature is preferably increased so the casing will expand in diameter to provide a larger tip clearance. A fan controller is programmed to permit a relatively hot casing shell average temperature during cool down and hot restart transient operations. The controller adjusts the variable fan speed such that ventilation flow is decreased during cool down and hot restart transients resulting in a hotter casing that maximizes running clearance for hot restarts.

An axial ventilation system for a gas turbine compartment may have approximately 50% of the total turbine compartment air flow be supplied through an annulus mounted at the aft end of the turbine shell. The annulus is used to form a low velocity jet that travels forward along the turbine shell and provides a uniform heat transfer boundary condition around the circumference. A chimney ventilation system draws air into ducts at the bottom of the compartment and exhaust air from the roof of the enclosure. Aspects of axial and chimney ventilation may be incorporated into a compartment ventilation system.

Controlling the correct air flow rate through the annulus of an axial ventilation system has a direct impact on the turbine shell casing temperature and in turn turbine clearance.

Ventilation systems also remove heat from inside the turbine compartment so that components such as space heaters do not overheat and the external compartment wall temperature does not exceed an allowable limit. To verify that heat removal is adequate, air thermocouples are mounted in the extract duct(s). The temperature in the exhaust duct is compared with a maximum operating limit, and the fan controller adjusts the ventilation air to keep the temperature, within limits.

Figure 2:
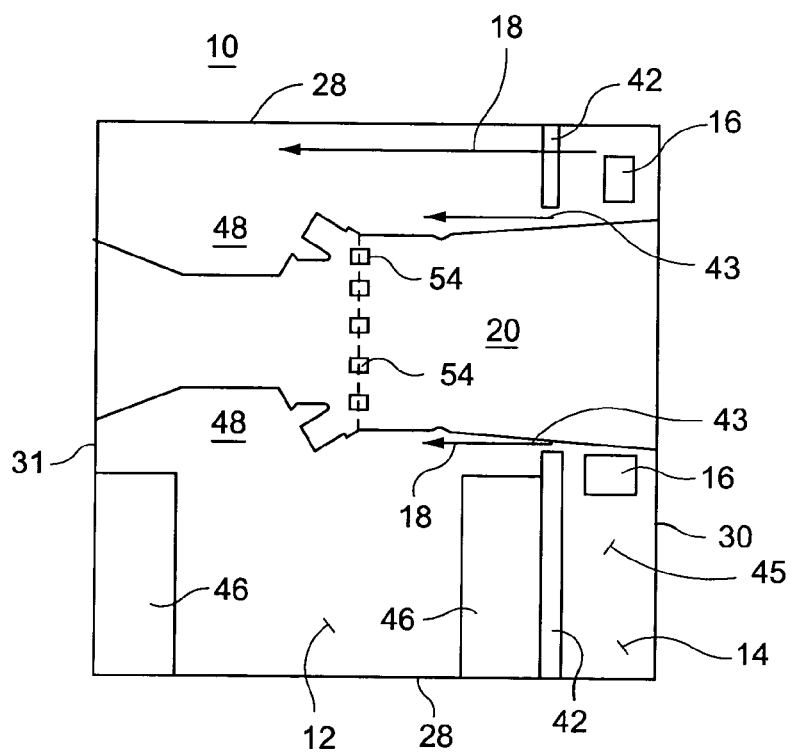
FIG. 2 is a section of the compartment shown in FIG. 1 taken along line 2—2.
Figure 3:
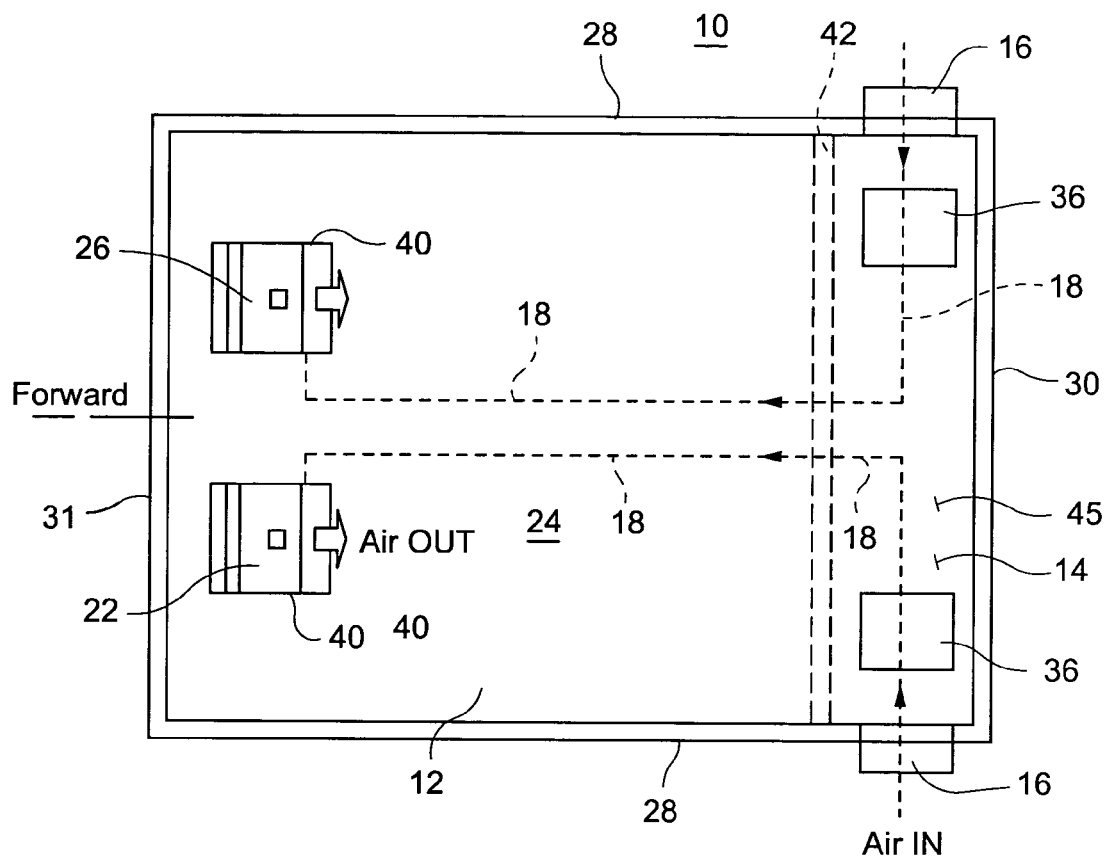
FIG. 3 is a top view of the turbine compartment shown in FIG. 1.

FIGS. 1 to 3 are schematic diagrams of a turbine compartment 10 for a gas turbine, wherein the compartment has an air flow circuit with a variable speed fan with feedback control. The turbine compartment is separated into forward 12 and aft 14 compartments. Inlet louvers 16 in the walls of the aft compartment feed the ventilation air 18 into the aft compartment. The air flows from the aft compartment to the turbine shell 20 annulus in that compartment. The ventilation air is drawn out of the forward compartment 12 with a suction fan 22 and discharged to the atmosphere. A fan, e.g., a one hundred percent (100%) flow capacity fan, is installed on the roof 24 of the compartment. Another fan 26 on the roof is used for backup, and is engaged when the first fan is disabled, for example.

The compartment 10 may or may not be located in a larger building. The compartment 10 has a pair of side walls 28, a pair of end walls 30, 31 and the roof 24. The compartment is typically rectangular in shape (the drawing figures are not to scale), with the side walls 28 extending parallel to the longitudinal axis (the axis of rotation or the turbine rotor) of a machine, such as a gas turbine.

Inlet end wall 30 is the inlet end of the compartment, and is provided with inlet openings or louvers 34 in an upper region of the inlet end wall. Additional air inlets or louvers 16 are provided in opposite side walls 28 adjacent the inlet end wall 30. Inlet openings or louvers 36 may be provided in the roof 24, also adjacent the inlet end wall. Ventilation exhaust outlet openings 40 are located on the roof 24, at the outlet end of the compartment, adjacent the end wall 31 opposite to the inlet end wall.

A barrier wall 42 is located in the interior of the compartment, extending parallel to the inlet end wall 30 in the inlet end region of the compartment. The gas turbine fits through an opening 43 in the barrier wall. This arrangement creates a plenum chamber 45 in the aft compartment 14. Ventilating air is introduced into the plenum chamber through all of the inlet openings or louvers mentioned above. The barrier wall 42 is formed with an opening 43 surrounding a portion of the casing 20 of the gas turbine, creating a roughly annular air gap best seen in FIG. 2.

The gas turbine casing 20 is supported by supports (not shown) that are, in turn, mounted on concrete pedestals 46. With the supports connected to opposite sides of the casing 20, it will be appreciated that a gap 48 extends substantially 360° about the casing, and that a large axial and circumferential portion of the entire casing is exposed to ventilating air.

Additional inlet openings or louvers 50 are located in the side walls 28 in the middle portion of the compartment, downstream of the barrier wall 42. These inlets 50 are located at lower elevations of the side and end walls so as to supply ventilating air into the compartment in areas below the turbine casing 20 and axially between the pedestals 46.

Fans 22, 26 are located proximate the outlets 40 on the roof 24 if the compartment 10 is outdoors. If the compartment is in a larger building, the fans are located outside the building and ducts extend between the fans and the compartment outlets 40 for the exhausted ventilation air.

Figure 4:
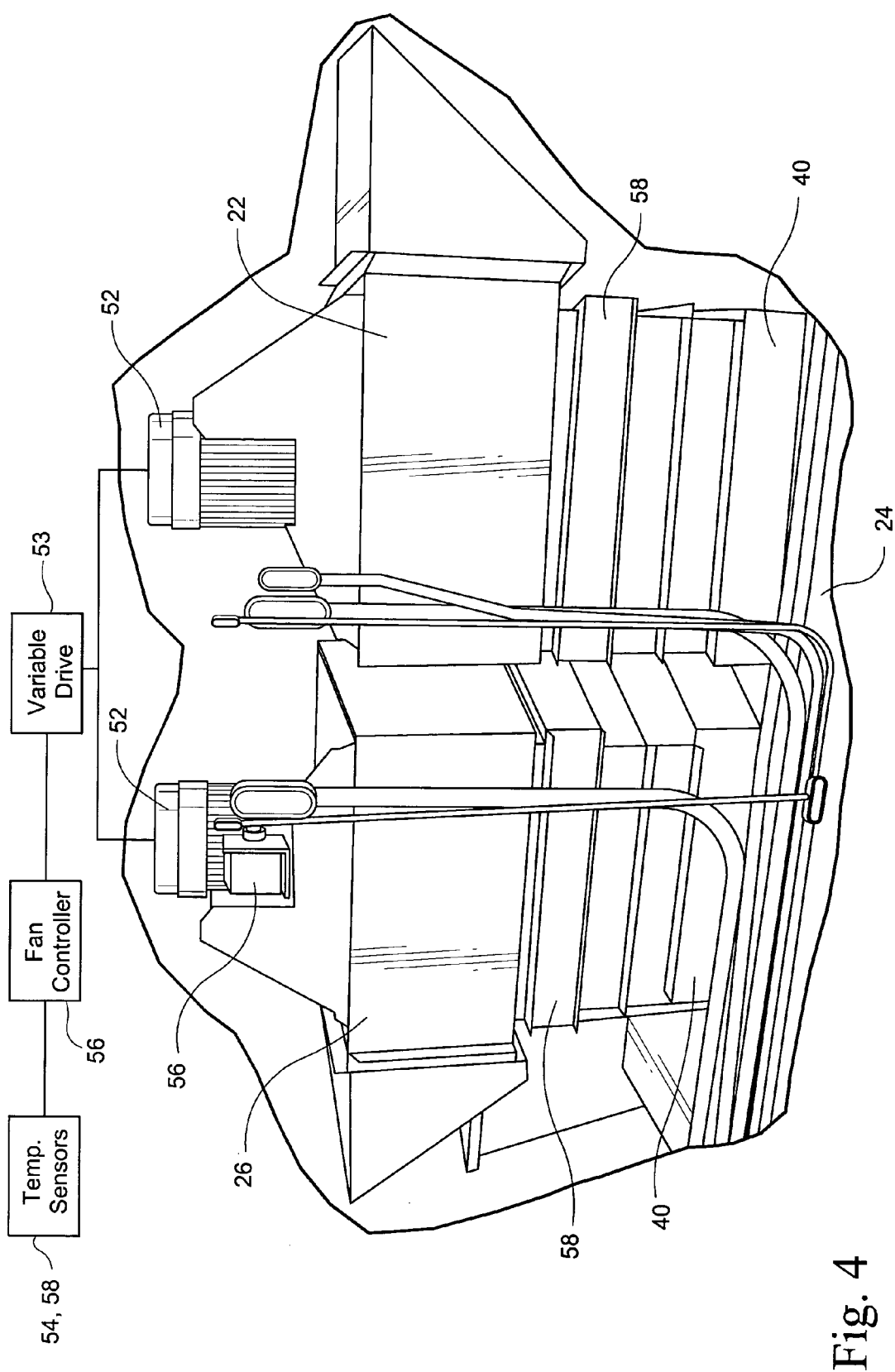
FIG. 4 is a side view of exhaust fans mounted on a roof of the compartment shown in FIG. 1.

As is shown in FIG. 4, the fans 22, 26 are driven by an electric motor 52 that is powered through a variable frequency drive. A power supply to a fan motor 52 is fed through the variable frequency drive. For closed loop control of the turbine shell casing temperature, metal thermocouples 54 are positioned on the casing to directly monitor casing 20 temperature. The thermocouple signals are provided to a controller 56. The controller executes an algorithm that calculates a required average casing temperature based on cycle operating conditions. Using the turbine casing thermocouple measurements as feedback, the fan speed is adjusted by the controller and variable frequency drive until the measured average casing temperature matches the required turbine casing temperature. The location of the turbine casing thermocouples 54 may be equally spaced around the casing circumference.

The air temperature leaving the turbine compartment is monitored by thermocouples 58 at the exhaust outlet 40 of the compartment 10. The air exhaust temperature is held below a pre-selected limit by the controller 56 and by adjusting the fan speed to decrease or increase ventilation and hence the exhaust temperature. Multiple air thermocouples 58, e.g., six, are installed in each exhaust duct 40, such as in the instrument section just upstream of the fan inlet. Using the exhaust duct air thermocouple 58 signals as feedback, the controller will automatically adjust fan speed until the measured exhaust temperature matches the target value.

When the fan(s) 22, 26 is turned on, ventilation air will be drawn into the plenum chamber 45 via the inlet openings or louvers 16, 34 and 36. The ventilating air accelerates as it passes through the roughly annular gap 43, creating an axial momentum that drives the ventilation air axially along the turbine casing 20, through the annular opening 43 and into the forward chamber 12. The flow of ventilating air is opposite the internal turbine flow.

As the axial momentum of the ventilating air dissipates, the natural buoyancy effect will eventually take over as the ventilation air is drawn upwardly to the roof outlets 40 at the downstream end of the compartment. At the same time, lesser quantities of ventilating air are drawn into the inlet openings or louvers 50 in the side walls 28, creating a transverse ventilation flow through the enclosure. By axially offsetting the inlet openings or louvers 50 good mixing of the ventilating air is achieved below the turbine and in the areas of the pedestals 46. This transversely introduced ventilation air is eventually drawn upwardly to mix with the main ventilating flow moving towards the outlets 40. If necessary, additional openings may be provided on the barrier wall 42 that are strategically located to reduce or eliminate any stagnant or recirculation zones within the compartment that would otherwise negatively impact the dilution ventilation capability.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to ventilate a rotary machine housed in a compartment having a ventilation air inlet and air exhaust, a variable speed ventilation fan and a temperature sensor, wherein said method comprises:

sensing a temperature level of the rotary machine, wherein the temperature level is sensed using an array of thermocouples mounted on a surface of or embedded within the rotary machine;

applying the sensed machine temperature level to a controller for said fan, drawing ventilation flow through the compartment and over the machine;

determining whether the sensed machine temperature level is beyond a desired temperature level of the rotary machine, wherein the desired temperature level is determined by the controller, and the controller setting an operational condition of the fan to adjust the ventilation flow through the compartment if the sensed machine temperature level is beyond the desired temperature level.

2. A method as in claim 1 wherein the rotary machine is a gas turbine and the ventilation flow moves, at least partially, over the gas turbine in an axial direction to the gas turbine.

3. A method as in claim 1 wherein the operational condition of the fan is a fan speed, and the controller adjusts a variable speed drive of the fan to increase or decrease a fan speed when the controller determines that the sensed machine temperature level is beyond the desired temperature level.

4. A method as in claim 1 wherein the compartment includes an end wall and a roof, wherein said ventilation air inlet is in said end wall and said ventilation air outlet is in said roof, and said fan is mounted on said roof.

5. A method as in claim 1 wherein the desired temperature level is at a first temperature during cool down and hot restart transient operational modes of the rotary machine and at a second temperature during steady state operation of the rotary machine, wherein the first temperature is hotter than the second temperature.

6. A method as in claim 1 wherein the rotary machine is a gas turbine having a combustor and the temperature level is sensed using an array of thermocouples mounted on a surface of or embedded within the gas turbine and said array is proximate to the combustor.

7. A method as in claim 1 wherein the sensed temperature level is an average of temperature readings from a plurality of temperature sensors mounted on an outer surface or embedded within a gas turbine.

8. A method as in claim 1 further comprising sensing a exhaust temperature of the ventilation flow as the flow passes through the outlet, and adjusting a speed of the fan if the sensed exhaust temperature differs from a predetermined exhaust temperature.

9. A method to ventilate an compartment housing a gas turbine, wherein the compartment includes an end wall having an inlet air opening, a roof with an outlet air opening and a fan adjacent the outlet air opening and said fan coupled to a variable speed drive including a controller, wherein said method comprises:

drawing ventilation air flow into the inlet air opening, to the gas turbine and exhausting the air flow through the outlet, wherein a flow rate of the ventilation air is dependent on a speed of the fan;

sensing a temperature level of the gas turbine based on signals from a plurality of temperature sensors mounted on a casing or embedded within the gas turbine, wherein the temperature sensor is an array of one or more thermocouples mounted on a surface or embedded within the gas turbine proximate to the combustor;

determining whether the sensed casing temperature is above or below a desired temperature level of the gas turbine, wherein the desired temperature level is determined by the controller, and the controller increasing or decreasing the speed of the fan to increase or decrease the flow rate through the compartment if the sensed casing temperature differs from the desired temperature level.

10. A method as in claim 9 wherein the ventilation flow moves, at least partially, over the gas turbine in an axial direction to the gas turbine.

11. A method as in claim 9 wherein the desired temperature level is at a first temperature during cool down and hot restart transient operational modes of the gas turbine and at a second temperature during steady state operation of the gas turbine, wherein the first temperature is hotter than the second temperature.

12. A method as in claim 9 wherein the temperature sensor is an array of one or more thermocouples mounted on a surface or embedded within the gas turbine and the sensed temperature level is an average of a plurality of temperature readings from the array of thermocouples.

13. A method to ventilate an compartment housing a gas turbine, wherein the compartment includes an end wall having an inlet air opening, a roof with an outlet air opening and a fan adjacent the outlet air opening and said fan coupled to a variable speed drive including a controller, wherein said method comprises:

drawing ventilation air flow into the inlet air opening, to the gas turbine and exhausting the air flow through the outlet, wherein a flow rate of the ventilation air is dependent on a speed of the fan;

sensing a temperature level of the rotary machine gas turbine based on signals from a plurality of temperature sensors mounted on a casing or embedded within the gas turbine;

determining whether the sensed casing temperature is above or below a desired temperature level of the gas turbine, wherein the desired temperature level is determined by the controller;

the controller increasing or decreasing the speed of the fan to increase or decrease the flow rate through the compartment if the sensed casing temperature differs from the desired temperature level, and sensing a exhaust temperature of the ventilation flow as the flow passes through the outlet, and increasing or decreasing the speed of the fan if the sensed exhaust temperature differs from the predetermined exhaust temperature.

14. A ventilated compartment for a rotary machine comprising:

said compartment having a roof, end walls and side walls with the machine arranged parallel or nearly parallel to the side walls and below the roof;

at least one ventilation air inlet located in to a first end wall of said end walls;

at least one ventilation air outlet on said roof and proximate to a second end wall opposite to said first end wall;

one or more fans for pulling ventilating air into said ventilation air inlets;

a variable speed drive coupled to said one or more fan motors;

at least one temperature sensor mounted on said machine and having an temperature sensor output, wherein the temperature sensor is an array of one or more thermocouples mounted on a surface or embedded within the rotary machine;

a fan controller receiving as an input the temperature sensor output, including a comparator for determining whether a temperature corresponding to the sensor output is above or below a reference temperature level determined by the controller, and generating an output control signal to the variable speed drive to adjust a speed of the fan if the reference temperature level is below or above the temperature corresponding to the sensor output.

15. A ventilated compartment as in claim 14 wherein the rotary machine is a gas turbine and the ventilation flow moves, at least partially, over the gas turbine in an axial direction to the gas turbine.

16. A ventilated compartment as in claim 14 wherein said fan is mounted on the roof.

17. A ventilated compartment as in claim 14 further comprising a temperature sensor in the outlet, and wherein the reference temperature is a high temperature during cool down and hot restart transient operational modes of the rotary machine and is a lower temperature during steady state operation of the rotary machine.

18. A ventilated compartment as in claim 14 wherein the rotary machine is a gas turbine having a combustor and the temperature sensor is an array of one or more thermocouples mounted on a surface or embedded within the gas turbine proximate to the combustor.

19. A ventilated compartment as in claim 18 wherein the sensed temperature level is an average of a plurality of temperature readings from a corresponding plurality of temperature sensors mounted on an outer surface or embedded within the gas turbine.

* * * * *